INVENTORS
SOL KESILMAN
HYMAN B. PENN
BY MILTON KRAVITZ

*Caesar and Rivise*

ATTORNEYS.

April 12, 1966  S. KESILMAN ETAL  3,245,548
COMMERCIAL DISH WASHER RACK
Filed March 12, 1964  5 Sheets-Sheet 2

INVENTORS
SOL KESILMAN
HYMAN B. PENN
MILTON KRAVITZ
BY
Caesar and Rivise
ATTORNEYS.

April 12, 1966     S. KESILMAN ETAL     3,245,548
COMMERCIAL DISH WASHER RACK

Filed March 12, 1964     5 Sheets-Sheet 3

INVENTORS
SOL KESILMAN
HYMAN B. PENN
BY   MILTON KRAVITZ

*Caesar and Rivise*

ATTORNEYS.

April 12, 1966  S. KESILMAN ETAL  3,245,548
COMMERCIAL DISH WASHER RACK
Filed March 12, 1964  5 Sheets-Sheet 4

INVENTORS
SOL KESILMAN
HYMAN B. PENN
BY MILTON KRAVITZ

*Caesar and Rivise*

ATTORNEYS.

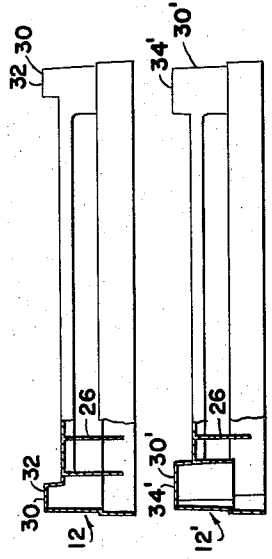
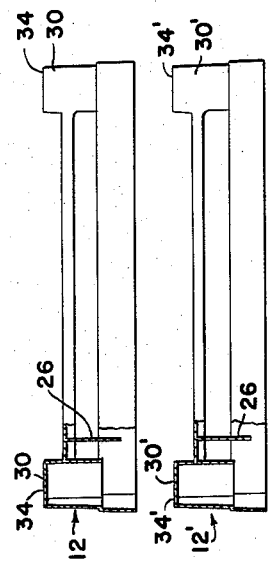
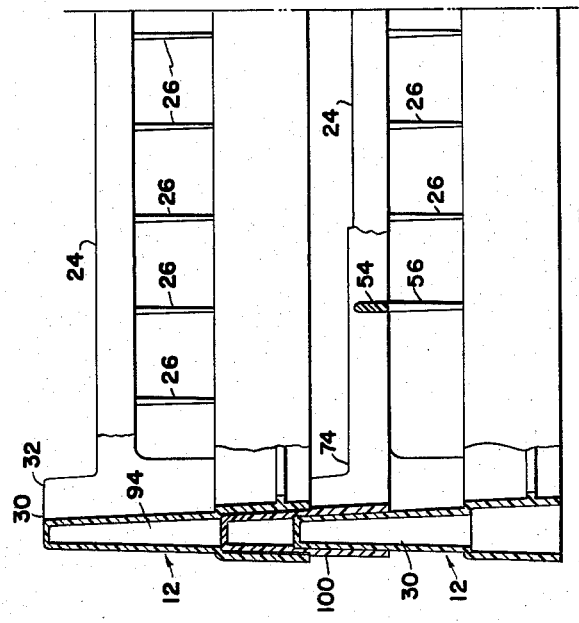
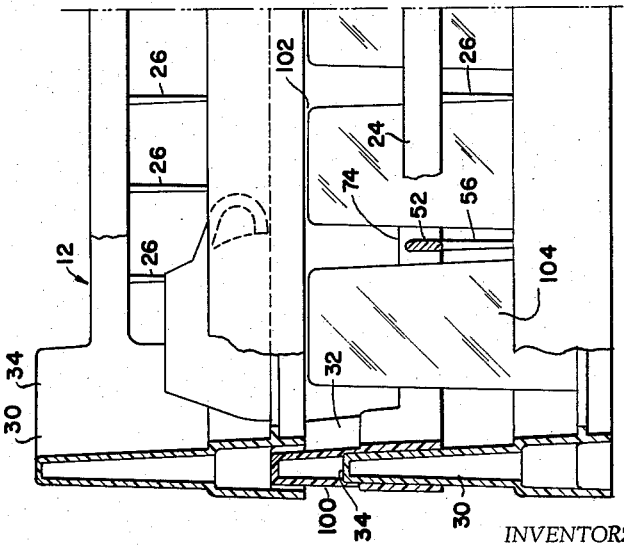

ates Patent Office 3,245,548
Patented Apr. 12, 1966

3,245,548
COMMERCIAL DISH WASHER RACK
Sol Kesilman, Cheltenham, Hyman B. Penn, Glenside, and Milton Kravitz, Philadelphia, Pa., assignors to Green Valley Products, Inc., Philadelphia, Pa., a corporation of Pennsylvania
Filed Mar. 12, 1964, Ser. No. 351,383
8 Claims. (Cl. 211—71)

This invention relates to a commercial dish washer rack and has as its objective the provision of a new and improved device of this general class.

The utilization of automatic equipment in washing dishes and utensils in the restaurant and allied trades is practically universal throughout the country. It is the practice to employ racks for holding the dishes, cups, glasses, utensils and other items that are to be washed and then dried by the automatic equipment.

In order to use the automatic equipment most efficiently, it has always been an objective to place a maximum amount of items to be washed in the automatic equipment at a given time. However, an important consideration has always been that there would still be sufficient space to permit a thorough circulation of the hot or cold cleansing water with or without detergent or soap.

In using commercial dish washer racks, the usual practice is to run the rack and the articles contained therein one by one through the machine and through the various washing and rinsing stages. The last stage generally involves a very hot rinse with the racks then being stacked one by one at a point removed from the dish washing area. The last hot rinse introduces considerable heat into the articles in the racks such that it is hoped that they will dry in the open area without the introduction of external heat or drying gasses.

However, it is always a necessity to conserve space, and this can be done by stacking the racks upon each other. It has even been suggested that the racks be so stacked that the lower surfaces of an upper rack contact the articles being held in the rack immediately below it.

Nevertheless, it is still desirable that some space be maintained between the respective racks so that there can be a circulation of the natural currents of air which are generated by the heated articles and which play an important part in the drying process. It is also to be noted that the racks are stacked not only for the purpose of permitting drying but also for storage of the articles that have been washed. It thus becomes even more important that the racks be stacked as closely as possible consistent with the achievement of proper drying in the open air.

It is therefore a principal object of the present invention to provide a commercial dish washer rack whereby vertically aligned racks may be so stacked that there will always be a space between the stacked racks in order to achieve a satisfactory drying action, but that this space may be held to a minimum for purposes of more efficient storage.

Yet another object of the present invention is to provide a commercial dish washer rack that is so constructed that the vertically aligned racks may be stacked closely adjacent to each other in one position or somewhat removed from each other in another position dependent upon the demands of a particular situation.

Still another object of the present invention is to provide a commercial dish washer rack whereby vertically aligned racks may be stacked very close to each other in a first position as when articles of less height, such as small cups and utensils, are being held in the rack.

Still another object of the present invention is to provide a commercial dish washer rack which can be so positioned with respect to an immediately adjacent vertically aligned rack of similar construction so that the respective racks will be stacked in a second position relatively removed from each other in order to accommodate taller articles, such as tall cups and glasses.

Yet another object of the present invention is to provide a commercial dish washer rack of extremely versatile construction such that the manufacturer can adapt a basic cup and bowl structure to be either a combination rack or a multipurpose rack or a compartmented cup and compartmented glass rack dependent upon the needs of the trade.

The foregoing as well as other objects of the invention are achieved by providing a commercial dish washer rack having peripheral edges along the sides thereof and including a relatively shallow channel construction therein, and also providing in portions of the channel construction open areas of greater depth. The aforesaid open areas are in part defined by locating posts that project upwardly from the corners of the rack. The locating posts are so designed that when two racks of the present invention are vertically aligned and stacked one upon the other that the aforesaid posts will interfit either in the shallow channel areas of the lower peripheral edges along the sides of the rack or in the deeper areas dependent upon the relative orientation of the two racks with respect to each other. When the two racks are oriented in the same manner with respect to each other, the locating posts will penetrate into the aforesaid deeper areas and thus the two racks will be stacked such that the space between them will be relatively small, and the two racks can be said to be in a "low stacked" position. However, if one of the racks is now rotated 90° with respect to its former position, the locating posts of the lower rack will not be able to penetrate beyond the channel areas and thus the racks will be stacked relatively far apart or in the "high stacked" position.

In addition to the foregoing, the commercial dish washer rack of the present invention also possesses a series of locating lugs whereby compartmentation for the purpose of receiving either cups or glasses may be simply secured to the basic rack, and the present invention also contemplates the utilization of adaptive means in order to increase the distance between the vertically aligned racks in both the "high stacked" and "low stacked" positions for purposes of accommodating extremely tall items such as iced tea glasses.

Other objects and many of the attendant advantages of the present invention will be readily appreciated as the same becomes better understood by reference to the following detailed description when considered in connection with the accompanying drawings wherein:

FIG. 3B is a view similar to FIG. 3A but taken along the lines 3B—3B of FIG. 2;

FIG. 16A is a schematic view showing two racks of the present invention in the same orientation with respect to each other so that they will stack more closely to each other or be "low stacked";

FIG. 16B is a schematic view similar to FIG. 16A but wherein the upper rack is now oriented 90° with respect to the lower rack from the position of FIG. 16A so that the two racks are stacked relatively far apart or in the "high stacked" position;

FIG. 17A is a fragmentary view of two vertically aligned or stacked racks of the present invention having a special attachment so that the racks will be stacked in the "high stacked" position at a distance from each other even greater than in the normal "high stacked" position in order to accommodate taller articles; and FIG. 17B is a fragmentary view similar to FIG. 17A but wherein the two racks have the same orientation with respect to each other and are therefore in the "low stacked" position in order to accommodate shorter articles.

Figures 1A, 1B:
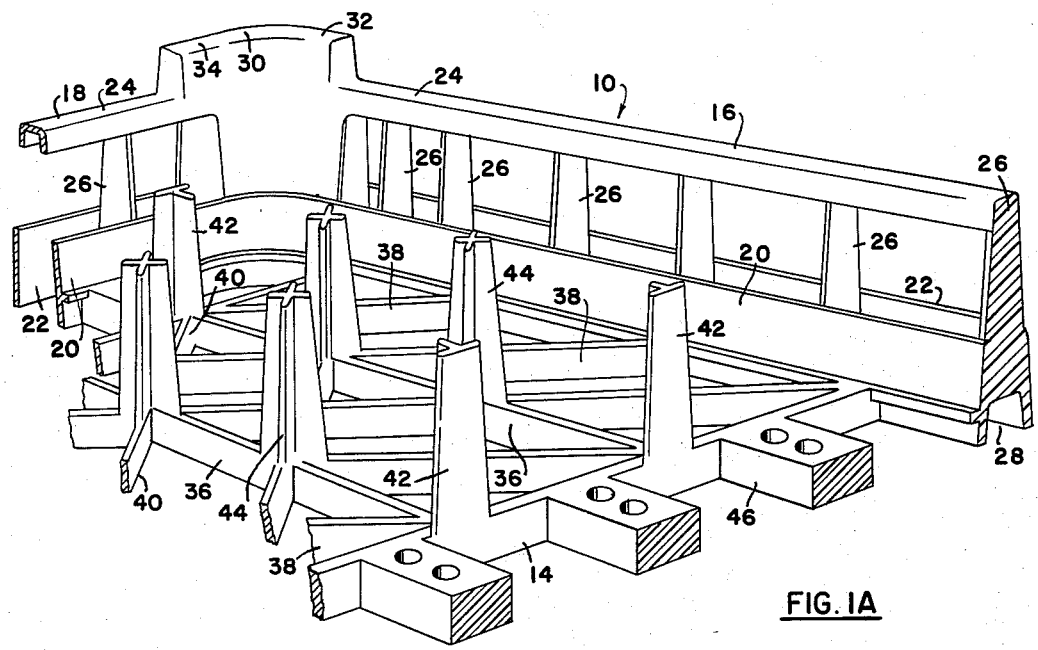
FIG. 1A is a fragmentary perspective view taken generally from the top face of a commercial dish washer rack known as a multi-purpose rack for supporting plates, trays, cups, glasses and bowls that embodies the present invention.
FIG. 1B is a view similar to FIG. 1A but taken of another commercial dish washer rack embodying the present invention and showing compartments adapted to hold a variety of articles such as cups and glasses.

Referring now to the various figures of the drawing wherein like reference characters refer to like parts, there is shown in FIGS. 1A and 1B commercial dish washer racks 10 and 12 which embody the present invention. The rack of FIG. 1A is adapted to support plates, trays and other articles in a generally vertical but somewhat tilted position and comprises a network area 14 surrounded by four peripheral walls, two of which, namely walls 16 and 18, are shown in FIG. 1A. The walls 16 and 18 and the other two walls of the rack are comprised of inner and outer panels 20 and 22 that are generally vertically disposed with respect to each other although slightly inclined upwardly toward each other. The walls 16 and 18 and the other two walls of the rack are further defined by a U-shaped top rail 24 that is held at appropriate position with respect to the inner and outer panels 20 and 22 by means of thin spacers 26. Since it is preferred to utilize plastic components in the present invention, it will readily occur to those skilled in the art that the aforesaid elements of the invention and the ones to be described hereinafter, may be integrally molded together in a well known manner.

As will be discussed hereinafter, the panels 20 and 22 define a space between them which enhances drainage of water and natural circulation of air. The space also assists in the high and low stacking function as will be discussed hereinafter.

As further shown in FIG. 3A, each of the spacer members 26 possesses a channel-like lower edge 28 that functions as a locating means in providing reception area for the U-shaped top rail of a rack of similar construction upon which the rack of FIG. 1A is stacked in the "high stacking" position as will be discussed hereinafter.

Attention is called to the fact that locating posts 30 project upwardly from each of the four corners of the racks of the present invention. As shown in FIG. 1A, the locating post 30 is L-shaped in that it possesses a short run or minor portion 32 adjacent wall 16 and a longer run or major portion 34 adjacent wall 18. As will be discussed hereinafter, when a rack of construction essentially similar to that of FIG. 1A is placed upon the rack shown in FIG. 1A, in one position thereof the locating post 30 will merely enter the channel-like lower edges 28 of the upper rack so that the racks will be in a "high stacked" relationship. However, if the upper rack is turned 90° with respect to its former position, the locating post 30 will be able to penetrate more deeply and beyond channel-like lower edge 28 so that the two racks will be stacked more closely with respect to each other in a "low stacking" position.

As further shown in FIG. 1A, the network area 14 comprises ridges 36 that run parallel to the wall 16 with further strength being afforded by inclined ridges 38 which in FIG. 1A run from the wall 16 to the wall 18 and second inclined ridges 40 that run perpendicular to the inclined ridges 38. As further shown in FIG. 1A, the rack 10 also includes uprights 42 of T-shaped cross-section and uprights 44 of X-shaped cross-section for supporting of plates in a generally vertical but somewhat inclined position. The rack 10 also includes central index strip 46 and side index strip 48 (FIG. 2) for advancing the racks through the automatic equipment of various manufacturers of dish washing machines.

Attention is now referred to FIG. 1B which shows a cup and glass rack 12 with fragmentary compartmentation 50. However, the rack of FIG. 1B is otherwise essentially similar to the rack of FIG. 1A and reference characters corresponding to the ones used in FIG. 1A are also used in FIG. 1B. In particular, the rack of FIG. 1B includes walls 16 and 18 defined by inner and outer panels 20 and 22 and U-shaped top rail 24 with spacers 26 and possessing channel-like lower edges 28. Locating posts 30 project upwardly from the rail 24 and the network 14 is comprised of the ridges 36, 38 and 40 as discussed in connection with FIG. 1A. However, the rack of FIG. 1B lacks uprights 42 and 44 and instead in one embodiment of the invention provides a relatively flat network area that will receive cups and bowls and other articles which do not require any special support. Where there is a problem that the various articles may come in contact with each other during the washing process, the compartmentation 50 may be added. As shown in FIG. 1B, the compartmentation 50 is comprised of webs 52 that run perpendicular to the wall 16 and webs 54 that run parallel to the wall 16.

Figure 2:
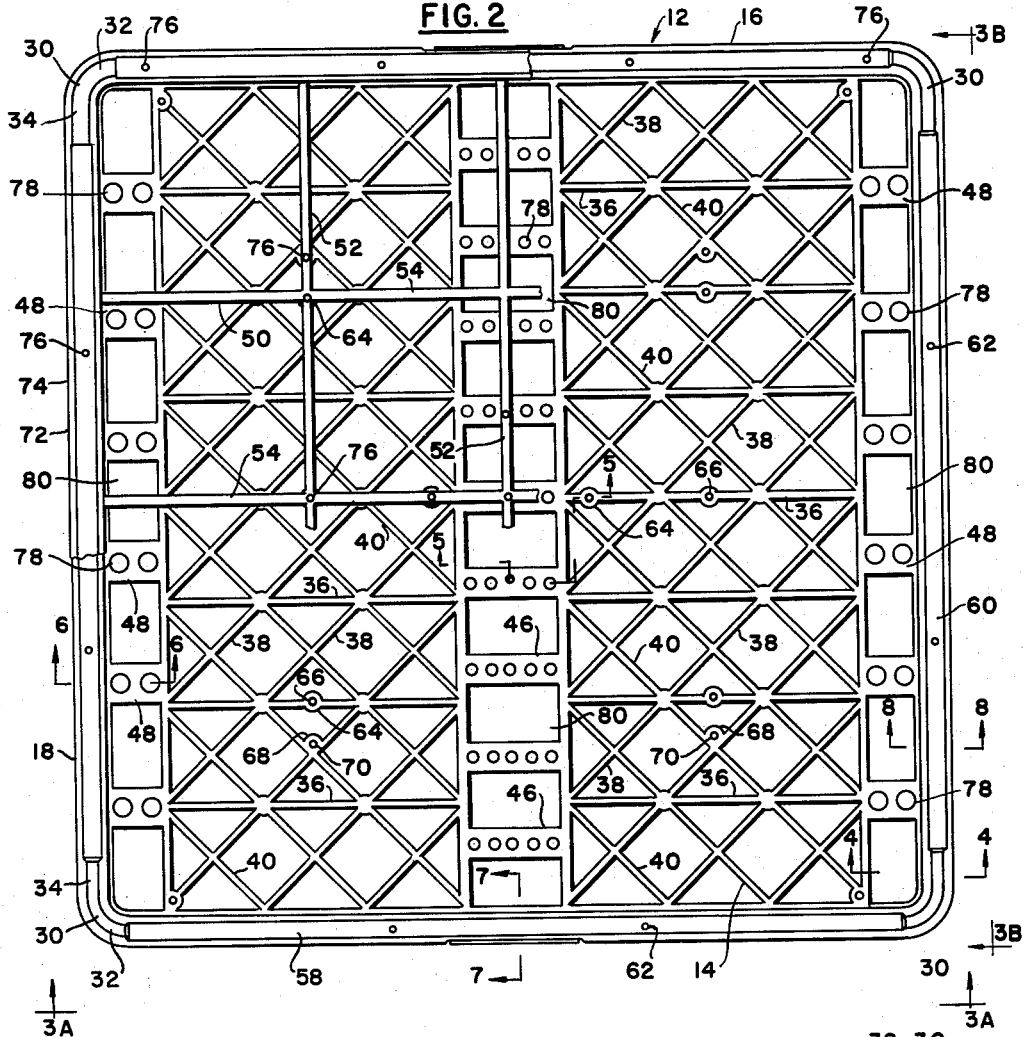
FIG. 2 is a top plan view on a reduced scale of a commercial dish washer rack embodying the present invention substantially similar to the rack shown in FIG. 1B.

The webs 52 and 54 together constitute a separate attachment that is secured to the lower sides of the walls 16 and 18 as generally illustrated in FIG. 1B. Depending downwardly from each of the webs 52 and 54 are spacer tongues 56 which prevent contact of the articles in adjacent compartments. It is to be understood that the precise number of webs 52 and 54 may be varied dependent upon the number of compartments desired. For instance, as shown in FIGS. 1B and 2, the compartmentation 50 is such that there will be sixteen compartments. However, this may be easily increased to twenty compartments by making the compartmentation system sub-divided into five rows of four compartments. In a similar manner, the compartmentation may be increased to twenty-five, thirty or thirty-six compartments, etc. In general, larger compartments are utilized to hold bowls and other broad articles, with the smaller compartments utilized to hold glasses, depending upon the widest dimension of the particular glasses to be washed.

Attention is now referred to FIG. 2 of the drawing which is a top plan view of a complete rack constructed along the lines of the rack of FIG. 1B. As previously discussed, the rack of FIG. 2 has four sides. Two of these sides are sides 16 and 18. The third side 58 is parallel to the side 16 and the fourth side 60 is parallel to the side 18. As is readily apparent from FIG. 2, the index strips 48 are located closely adjacent either the side 18 or the side 60, and the parallel sides 16 and 58 lie generally perpendicular to the lines of index strips 46 or 48. Also, the short run 32 of locating post 30 merges either into sides 16 or 58 with the long run 34 of the locating post 30 merging either into the side 18 or the wall 60.

As further shown in FIG. 2, the top rail 24 which forms any of the walls 16, 18, 58 or 60 has spaced openings 62 between adjacent spacers 26 formed therein. Also, the ridges 36 of the network area 14 that lie parallel to either walls 16 or 58 have lugs 64 having openings 66 associated therewith. Similar lugs 68 with openings 70 are also associated with certain of first and second inclined ridges 38 and 40. The purpose of the openings 62 in the top rails 24 and the openings 66 and 70 in the lugs 64 and 68 is to receive the compartmentation 50 which is actually presented to rack 12 in the form of an overlay 72.

This is shown in FIG. 2 wherein the webs 52 and 54 of the compartmentation extend from U-shaped top rails 24 as illustrated in FIG. 1B. Pegs 76 depend downwardly from portions of the U-shaped rails 74 or from the webs 52 and 54, and the pegs 76 are adapted to interfiit within the openings 62, 66 or 70 as the case may be. Since the plastic from which the racks of the present invention are made is thermoplastic or heat active, the pegs 76 can be anchored firmly in place by a heat welding technique or mechanical means.

Attention is further referred to the fact that the index strips 46 and 48 have openings 78 formed therein with openings 80 being provided between the index strips. Furthermore, the racks of the present invention possess considerable open areas to increase the circulation of wash water, enhance drainage and permit the circulation of natural air currents. In this connection attention is called to the considerable space between ridges 36, 38 and 40, the space between inner and outer panels 20 and 22 and the large openings in the walls between spacers 26 as shown in FIGS. 1A, 1B, 3A and 3B.

In order to facilitate the handling of the racks of the present invention, there is formed in walls 16 and 58 thereof handle sections 82 which include a gripping area 84 that is outlined by a small ridge 86 and a grasping shoulder 88.

Figure 3A:
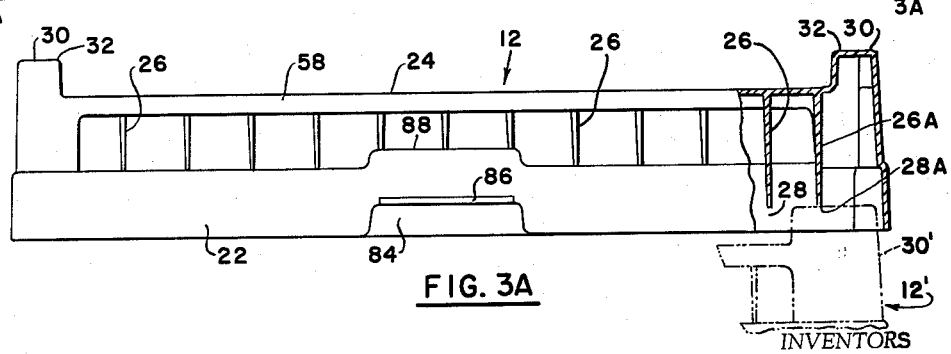
FIG. 3A is an elevational view taken along the lines 3A—3A of FIG. 2.

As is readily apparent from an inspection of FIG. 3A, the wall 58 is generally in view and therefore the short runs 32 of the locating posts 30 are visible. FIG. 3B shows the wall 60 that is perpendicular to the wall 58. The walls 58 and 60 as well as walls 16 and 18 have several points of construction in common, but also have important differences. In particular, the points in common include inner panel 20, outer panel 22, spacers 26 and top rail 24. However, the wall 60 (FIG. 3B) also includes the long runs 34 of the locating posts 30. In addition to this, it is to be noted that the spacers 26 with the channel-like lower edges 28 terminate at a distance somewhat removed from the long run 34 of the locating posts 30. This makes for an elongated gap beneath long runs 34 and, as clearly shown in FIG. 3B, the long run 34 of the locating post 30 is defined by a short wall 90 that terminates in a lower edge 92 that does not extend downwardly as much as the channel-like lower edges 28 of the spacers 26.

The aforesaid important differences in construction of the walls 58 and 60 permit two racks of a construction in accordance with the present invention to be stacked one upon the other in either a "high stacking" or "low stacking" position depending upon the orientation with respect to each other. As shown in FIG. 3B, in phantom, a lower rack with a comparable side is so positioned that upper rack 12 with side 60 rests thereon. In this position the locating post 30' of the lower rack can penetrate to lower edge 92 of the short wall 90. This penetration is limited only by the abutment of top rail of the lower rack against the lower edge of outer panel 22 of the upper rack or within the channel-like edges 28 as determined by the design of the particular rack. It is to be noted from the aforesaid stacking arrangement that the locating post 30' penetrates considerably beyond the channel-like lower edges 28. In this position of deep penetration two racks are located relatively close to each other and this is known as the "low stacking" position.

In FIG. 3A, however, the upper rack 12 has been turned 90° from its position of FIG. 3B. In this stacking arrangement the locating post 30' cannot penetrate beyond the channel-like lower edges 28 of the spacer 26 because there is a spacer 26A with a lower edge 28A (FIG. 3A) that limits the penetration of the locating post 30'. Thus, the racks of FIG. 3A are stacked in a "high stacking" position since the racks are relatively spaced from each other a greater distance than in FIG. 3B.

Figure 9:
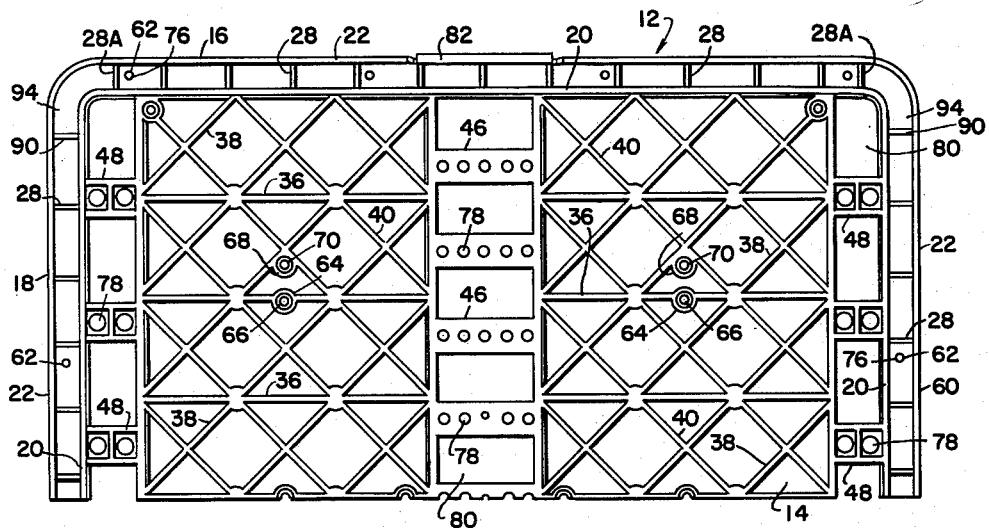
FIG. 9 is a fragmentary bottom plan view of the rack of FIG. 2.

The aforesaid details of construction are readily apparent in FIG. 9 which is a bottom plan view of the rack of FIG. 2 and which specifically shows the area 94 that permits the penetration of lower locating post 30' when upper and lower racks are oriented with respect to each other in the same relationship. Should, however, one of the racks be rotated 90° with respect to the other rack, then the locating posts thereof will abut against the channel-like lower edges 28A of FIG. 9, and permit only a shallow penetration of the locating post 30' and thereby achieve a "high stacking" position.

Figure 4:
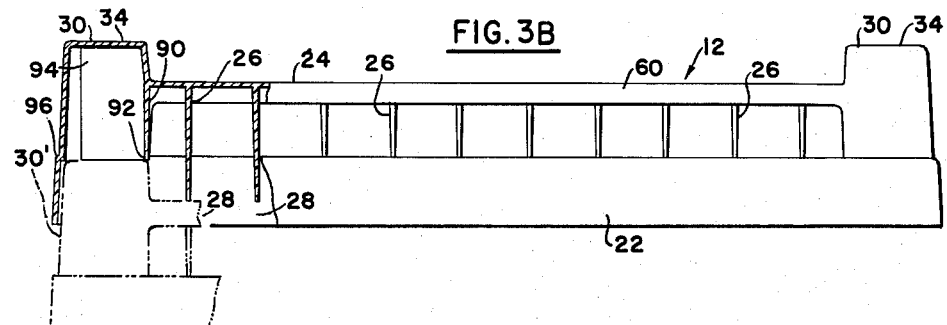
FIG. 4 is an enlarged sectional view taken along the lines 4—4 of FIG. 2.
Figure 4:
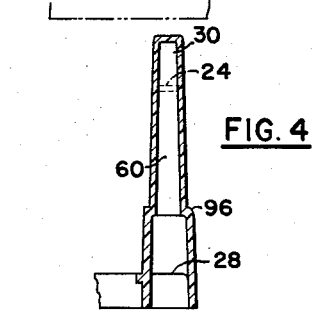
Figure 5:
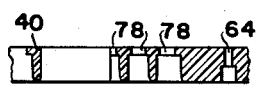
FIG. 5 is an enlarged sectional view taken along the lines 5—5 of FIG. 2.
Figure 6:
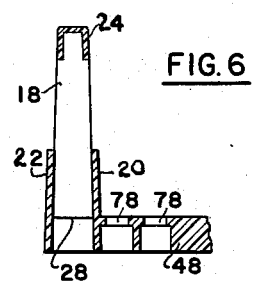
FIG. 6 is an enlarged sectional view taken along the lines 6—6 of FIG. 2.
Figure 7:
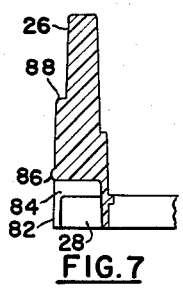
FIG. 7 is an enlarged sectional view taken along the lines 7—7 of FIG. 2.
Figure 8:
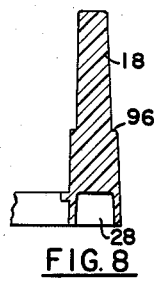
FIG. 8 is an enlarged sectional view taken along the lines 8—8 of FIG. 2.

Further details of the rack of FIG. 2 are shown in FIGS. 4 to 8 wherein corresponding reference numerals are used. As shown in FIG. 4, the outer panel 22 has an indentation 96 formed therein and the locating post 30 projects upwardly therefrom. The U-shaped top rail 24 is also shown as dashed in FIG. 4. The details of the index strip 46 are shown in FIG. 5 and FIG. 6 shows the details of an index strip 48. FIG. 7 shows the details of a handle section 82 as was previously discussed and FIG. 8 is a view similar to FIG. 6 but taken through one of the spacer members.

Figure 13:
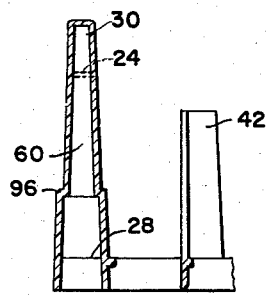
FIG. 13 is an enlarged sectional view taken along the lines 13—13 of FIG. 10.
Figure 12:
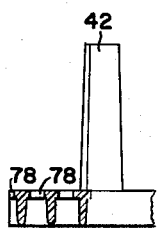
FIG. 12 is an enlarged sectional view taken along the lines 12—12 of FIG. 10.
Figure 11:
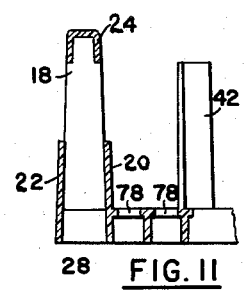
FIG. 11 is an enlarged sectional view taken along the lines 11—11 of FIG. 10.
Figures 10, 14:
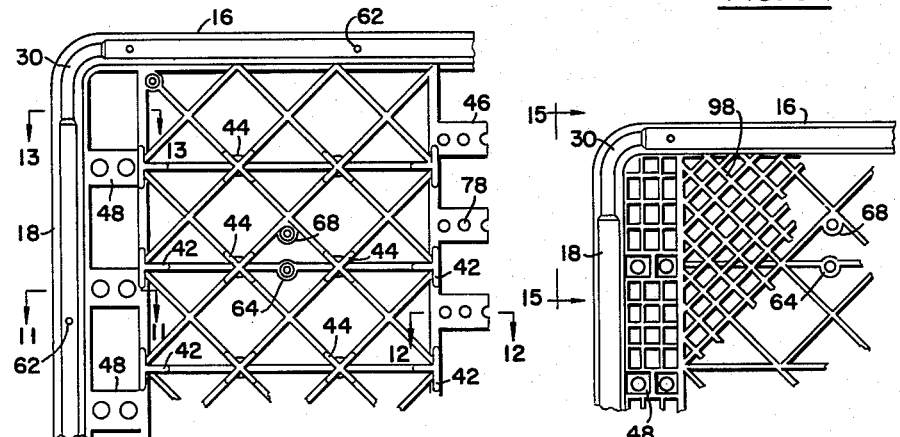
FIG. 10 is a fragmentary top plan view similar to FIG. 2 but taken of the rack of FIG. 1A.
FIG. 14 is a fragmentary top plan view similar to FIG 10 but of a combination rack that is adapted to handle a variety of articles including flat ware, cups and bowls.
Figure 15:
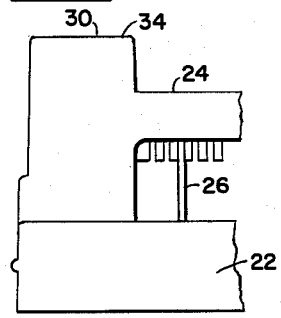
FIG. 15 is a side elevational view taken along the lines 15—15 of FIG. 14.

FIG. 10 is based on the the rack of FIG. 1A which possesses uprights 42 and 44. FIGS. 11, 12 and 13 are sectional views taken from FIG. 10 in order to show further details of the FIG. 10 rack. FIG. 11 is similar to FIG. 6 and FIG. 12 is similar to FIG. 5 with FIG. 13 being similar to FIG. 4. FIG. 14 is a view similar to FIG. 10 but shows a fragmentary to plan view of a combination rack with network 98 somewhat different from network 14. However, the rack of FIG. 14 includes the high and low stacking features of the present invention. FIG. 15 is an elevational view showing further details of the side wall of the rack of FIG. 14.

The high and low stacking positions of the present invention as discussed in connection with FIGS. 3A and 3B are shown schematically in FIGS. 16A and 16B. In FIG. 16A the upper rack 12 and the lower rack 12' are oriented in the same sense with respect to each other. In other words, the long runs 34' and 34 are directly above one another. In this position the two racks will be stacked in a low stacking position as shown in FIG. 3B since the locating post 30' of the lower rack can interfit and penetrate beyond channel-like lower edges 28 to edge 92. In FIG. 16B, however, the upper rack 12 has been turned 90° from its position of FIG. 16A. In the position of FIG. 16B the locating post 30' cannot project into the lower edges of the upper rack 12 beyond the channel-like lower edges 28 and thus in FIG. 16B as in FIG. 3A the racks are stacked in a "high stacking" position or are stacked relatively far apart.

Where tall glasses are to be washed as shown in FIG. 17A, it is sometimes desirable that the spacing between the stacked racks be increased. This is achieved by adding an overlay 100 upon the locating post 30 as shown in FIG. 17A and thus in the high stacking position wherein upper and lower racks are oriented 90° with respect to each other, there is a still greater spacing between the vertically aligned racks. In this connection attention is called to the fact that a space 102 exists between the upper surface of the bottom of the taller glasses 104 and the lower edge of the upper rack. This space 102 or one comparable thereto can be found in all embodiments of the present invention since the racks can be oriented with respect to each other in order to achieve either high or low stacking as the nature of the articles to be washed demands.

Finally, attention is referred to FIG. 17B wherein the upper rack has been turned 90° from its position of FIG. 17A. Since the respective sides of the upper and lower racks are now in alignment as shown by the presence of short runs 32 in both upper and lower racks as viewed in FIG. 17B, the two racks of FIG. 17B may be stacked more closely to each other or in a "low" position with the posts overlay 100 merely penetrating further within area 94 of the upper locating post. However, there is still a space between the stacked racks as shown in FIG. 17B showing that in the "low" position the racks will be stacked somewhat further apart than in the "low" positions of the racks of other figures of the drawing.

It is thus seen that a commercial dish washer rack is provided of such a construction that two racks embodying the present invention may be stacked with respect to each other in one of two positions. In one position the posts of the lower rack will abut against the peripheral edges of the upper rack with but shallow penetration and thus the two racks may be said to be stacked in a "high stacking" position. However, if one of the racks is then turned 90° from its former position, the locating posts of the lower rack will be able to penetrate further within the peripheral edges of the upper rack than in the first position and thus the two racks may be said to be in a "low stacking" position.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A two position stackable commercial dish washer rack having peripheral sides and a network area for holding articles to be washed, certain of the sides of the rack being defined by inner and outer panels associated with a top rail, locating posts projecting from said top rail, said inner and outer wall panels defining a space with limiting means positioned therein to limit the penetration of locating posts of another dish washer rack to a relatively small amount so that the racks will be stacked relatively far apart in a first stacking position, certain of the area adjacent said posts being free of said limiting means, and certain other area adjacent said post having said limiting means wherein said locating posts can penetrate beyond said limiting means in said areas that are free of said limiting means, whereby said racks may also be stacked relatively closely in a second stacking position, said rack having four sides including a first pair of parallel sides and a second pair of parallel sides perpendicular to said first pair of sides, said locating posts being positioned at the corners of said rack, said locating posts being L-shaped and including a major portion associated with one of said parallel sides and a minor portion associated with a side perpendicular to said parallel side, said limiting means being spacer members extending between said inner and outer panels and having a channel shaped lower edge to receive a portion of said post in said first stacking position, and an L-shaped reception area with an open lower end being provided within said locating posts, said L-shaped reception area having major and minor portions corresponding to the major and minor portions of said posts.

2. The invention of claim 1 wherein a spacer member is positioned closely adjacent the minor portion of said reception area substantially to prevent entry of the major portions of said posts into said reception area in said first stacking position.

3. The invention of claim 2 wherein a spacer member is positioned beyond the major portions of said reception area whereby the major portion of said posts can penetrate into said reception area in said second stacking position.

4. The invention of claim 3 wherein said first and second stacking positions are related ninety degrees with respect to each other.

5. A two position stackable commercial dish washer rack having peripheral sides and a network area for holding articles to be washed, certain of the sides of the rack being defined by inner and outer panels associated with a top rail, locating posts projecting from said top rail, said inner and outer wall panels defining a space with limiting means positioned therein to limit the penetration of locating posts of another dish washer rack to a relatively small amount so that the racks will be stacked relatively far apart in a first stacking position, certain of the area adjacent said posts being free of said limiting means, and certain other area adjacent said posts having said limiting means wherein said locating posts can penetrate beyond said limiting means in said areas that are free of said limiting means, whereby said racks may also be stacked relatively closely in a second stacking position, said network area being defined by intersecting ridges, and complementary openings in said top rail and network to receive a compartmentation overlay.

6. A two position stackable commercial dish washer rack having peripheral sides and a network area for holding articles to be washed, certain of the sides of the rack being defined by inner and outer panels associated with a top rail, locating posts projecting from said top rail, said inner and outer wall panels defining a space with limiting means positioned therein to limit the penetration of complementary locating posts of a second dish washer rack to a relatively small amount so that the racks will be stacked relatively far apart in a first stacking position, certain portions of said space between said posts being free of said limiting means, and certain other area adjacent said posts having said limiting means whereby said locating posts can penetrate a relatively large amount beyond said limiting means in a second stacking position so that in said second stacking position said racks may be stacked relatively closely to each other.

7. The invention of claim 6 wherein said locating posts are positioned at at least one corner of said rack, said locating posts being L-shaped.

8. The invention of claim 7 wherein said first and second stacking positions are related ninety degrees with respect to each other.

References Cited by the Examiner

UNITED STATES PATENTS

| | | | |
|---|---|---|---|
| 2,652,174 | 9/1953 | Shea et al. | 220—97 X |
| 2,931,535 | 4/1960 | Lockwood | 220—97 |
| 2,949,207 | 8/1960 | Rehrig | 220—19 |
| 2,997,155 | 8/1961 | Muckler et al. | 211—41 X |
| 3,009,579 | 11/1961 | Ettlinger | 211—71 |
| 3,136,443 | 6/1964 | Muckler | 220—19 |
| 3,141,552 | 7/1964 | Ettlinger | 211—41 |
| 3,160,308 | 12/1964 | Hare et al. | 220—19 |

CLAUDE A. LE ROY, *Primary Examiner.*

FRANK L. ABBOTT, CHANCELLOR E. HARRIS,
*Examiners.*